Patented Dec. 27, 1949

2,492,194

UNITED STATES PATENT OFFICE 2,492,194

CHEMICAL COMPOUNDS AND PROCESS OF PREPARING THE SAME

Lewis H. Sarett, Princeton, N. J., assignor to Merck & Co., Inc., Rahway, N. J., a corporation of New Jersey No Drawing. Original application July 14, 1945, Serial No. 605,194. Divided and this application February 23, 1946, Serial No. 649,766

4 Claims. (Cl. 260—397.4)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone Δ4,5-3,11,20-triketo-17(β), 21-dihydroxy pregnene. This application is a divisional of copending application Serial No. 605,194 filed July 14, 1945, now abandoned.

This hormone is known to occur naturally in the adrenal cortex; it has the structural formula:

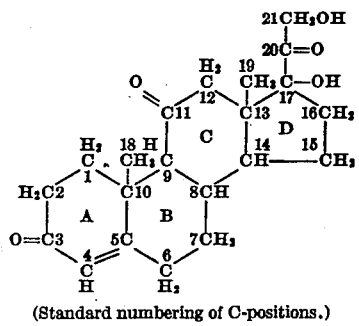

(Standard numbering of C-positions.)

This formula, for purposes of convenience, is hereinafter reproduced below in the abbreviated form:

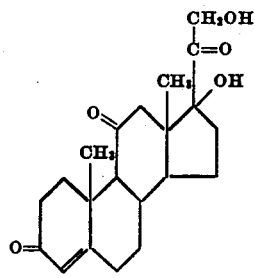

In the following description of the invention, the stereochemical relationships of substituents are indicated by the following conventions:

1. A substituent at the C-3 position which is trans to the C-10 methyl group is parenthetically designated (α).

2. A substituent at the C-17 position, the stereochemical configuration of which is identical with that of the naturally occurring adrenal hormones, is parenthetically designated (β); the epimeric configuration is designated (α). In the structural formulae the former configuration is shown by writing the C-17 substituent (hydroxyl) to the right of the C-17 carbon side chain, thus

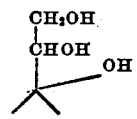

in the latter case above the side chain, thus

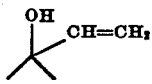

3. The stereochemical relationship of rings A and B is indicated in the formulae by a solid line representing the valence bond in the cis configuration.

In accordance with the present invention it is now found this hormone can be synthesized by reactions indicated as follows:

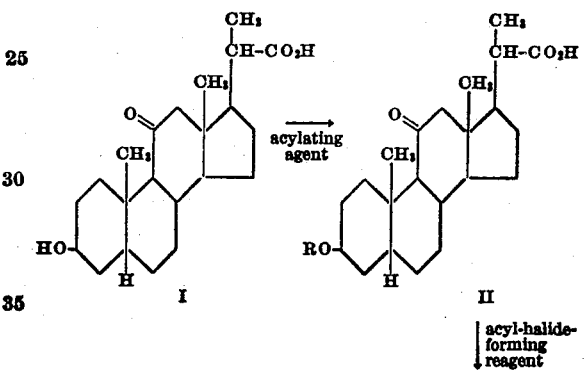

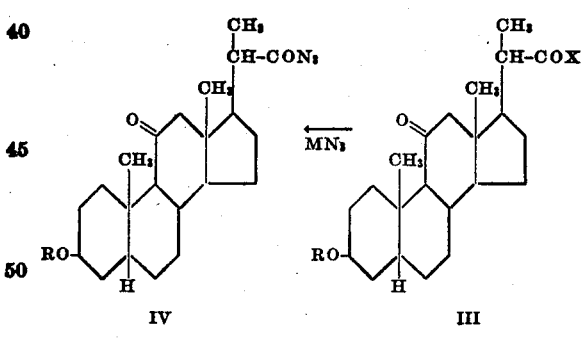

↓

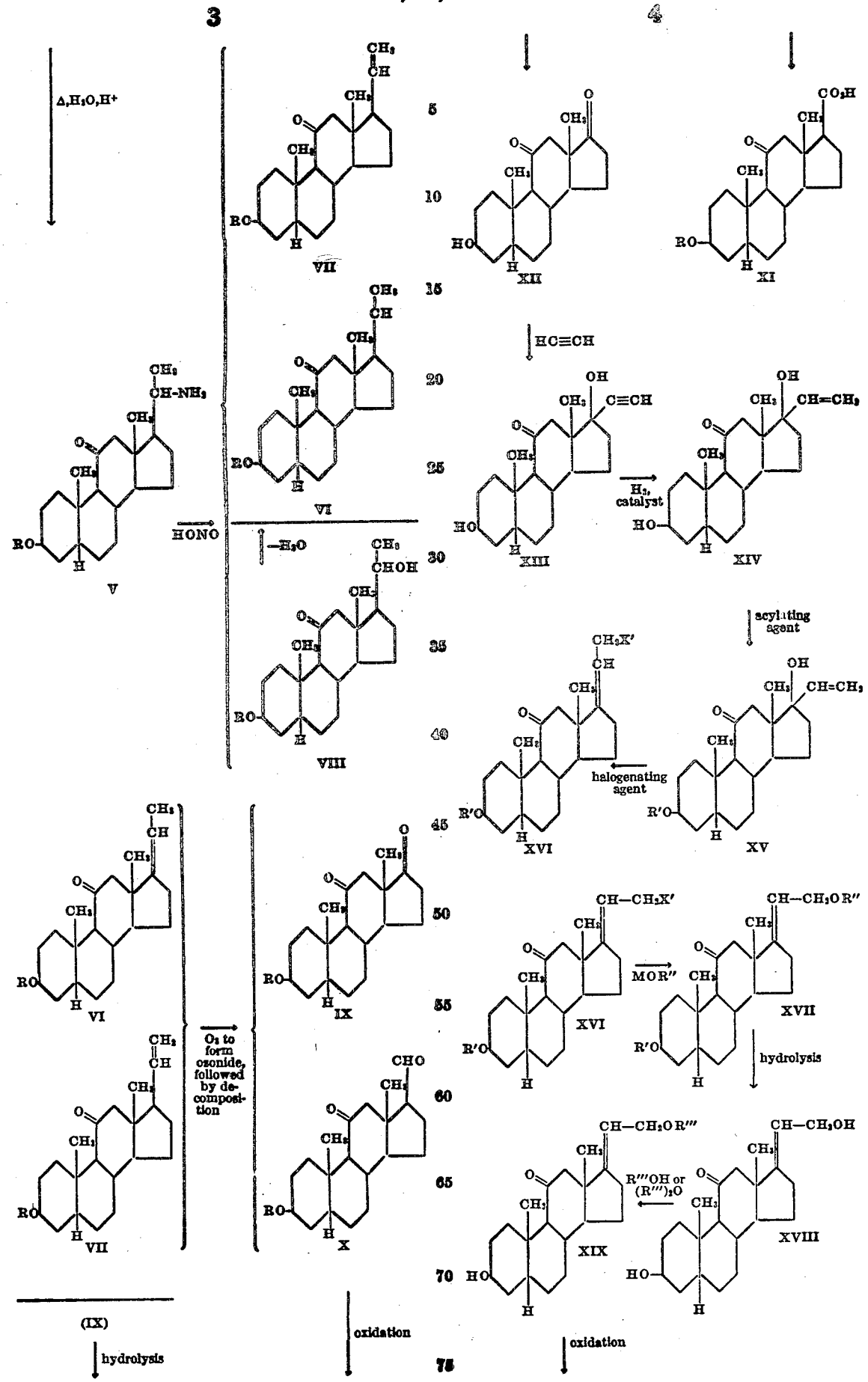

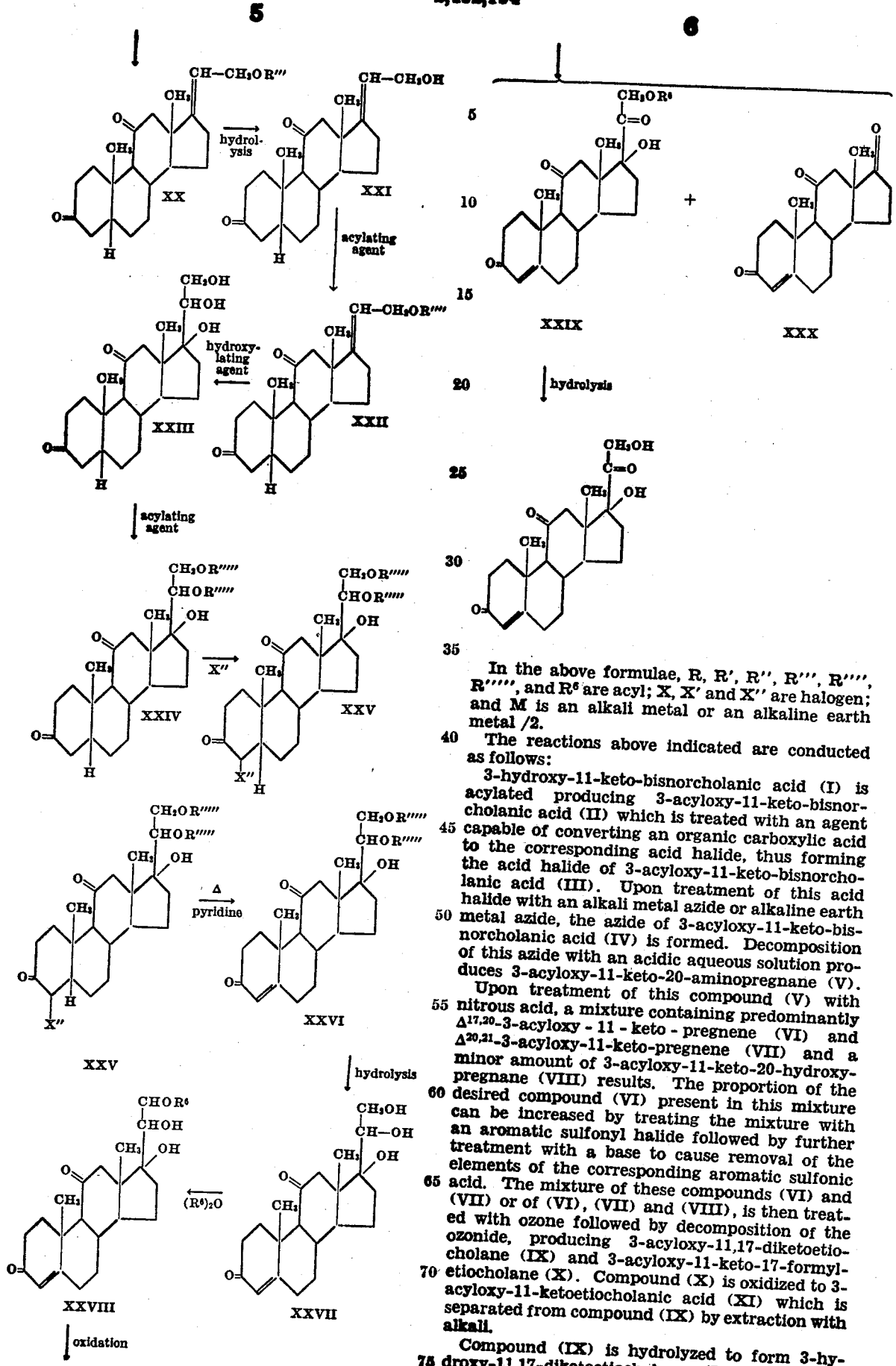

In the above formulae, R, R', R'', R''', R'''', R''''', and R⁶ are acyl; X, X' and X'' are halogen; and M is an alkali metal or an alkaline earth metal /2.

The reactions above indicated are conducted as follows:

3-hydroxy-11-keto-bisnorcholanic acid (I) is acylated producing 3-acyloxy-11-keto-bisnorcholanic acid (II) which is treated with an agent capable of converting an organic carboxylic acid to the corresponding acid halide, thus forming the acid halide of 3-acyloxy-11-keto-bisnorcholanic acid (III). Upon treatment of this acid halide with an alkali metal azide or alkaline earth metal azide, the azide of 3-acyloxy-11-keto-bisnorcholanic acid (IV) is formed. Decomposition of this azide with an acidic aqueous solution produces 3-acyloxy-11-keto-20-aminopregnane (V).

Upon treatment of this compound (V) with nitrous acid, a mixture containing predominantly $\Delta^{17,20}$-3-acyloxy-11-keto-pregnene (VI) and $\Delta^{20,21}$-3-acyloxy-11-keto-pregnene (VII) and a minor amount of 3-acyloxy-11-keto-20-hydroxypregnane (VIII) results. The proportion of the desired compound (VI) present in this mixture can be increased by treating the mixture with an aromatic sulfonyl halide followed by further treatment with a base to cause removal of the elements of the corresponding aromatic sulfonic acid. The mixture of these compounds (VI) and (VII) or of (VI), (VII) and (VIII), is then treated with ozone followed by decomposition of the ozonide, producing 3-acyloxy-11,17-diketoetiocholane (IX) and 3-acyloxy-11-keto-17-formyletiocholane (X). Compound (X) is oxidized to 3-acyloxy-11-ketoetiocholanic acid (XI) which is separated from compound (IX) by extraction with alkali.

Compound (IX) is hydrolyzed to form 3-hydroxy-11,17-diketoetiocholane (XII) which is treated with acetylene to form 3,17-dihydroxy-11-keto-pregnine-20 (XIII). This compound (XIII) is catalytically hydrogenated to produce $\Delta^{20,21}$-3,17-dihydroxy - 11 - ketopregnene (XIV) which is acylated to form $\Delta^{20,21}$-3-acyloxy-17-hydroxy-11-ketopregnene (XV), and this compound is halogenated to produce $\Delta^{17,20}$-3-acyloxy-11-keto-21-halopregnene (XVI). When treated with an alkali metal salt or alkaline earth metal salt of an organic acid, this compound yields $\Delta^{17,20}$-3,21-diacyloxy - 11 - ketopregnene (XVII) which is hydrolyzed producing $\Delta^{17,20}$-3,21-dihydroxy-11-ketopregnene (XVIII). The latter product (XVIII) is partially esterified and the mono ester (XIX) thus produced is oxidized to convert the unesterified hydroxy group in the 3 position to a keto group, thereby yielding the ester of $\Delta^{17,20}$-3,11-diketo-21-acyloxy-pregnene (XX). This product (XX) is hydrolyzed and the $\Delta^{17,20}$-3,11 - diketo - 21 - hydroxypregnene (XXI) thus formed is acylated producing $\Delta^{17,20}$-3,11-diketo-21-acyloxypregnene (XXII). Hydroxylation at the unsaturation of the last mentioned compound (XXII) results in the production of 3,11 - diketo - 17($\beta$),20,21 - trihydroxypregnene (XXIII) which is then acylated to form 3,11-diketo-17($\beta$)-hydroxy - 20,21 - diacyloxypregnene (XXIV). When brominated, this compound yields 3,11-diketo-4-bromo-17($\beta$)-hydroxy-20,21-diacyloxypregnene (XXV).

This compound is then treated with a reagent capable of removing the elements of hydrogen bromide, thereby producing $\Delta^{4,5}$-3,11-diketo-17($\beta$)-hydroxy-20,21-diacyloxypregnene (XXVI) which on hydrolysis forms $\Delta^{4,5}$-3,11-diketo-17($\beta$)-20,21 - trihydroxypregnene (XXVII). Partial acylation of this compound (XXVII) gives $\Delta^{4,5}$-3,11-diketo-17($\beta$),20 - dihydroxy-21-acyloxypregnene (XXVIII) which, when oxidized, yields a mixture of $\Delta^{4,5}$-3,11,20-triketo-17($\beta$)-hydroxy-21-acyloxypregnene( XXIX) and $\Delta^{4,5}$-3,11,17-triketo androstene (XXX). Compounds (XXIX) and (XXX) may be separated by conventional operations, for example chromatography, and compound (XXIX) hydrolyzed to produce the desired adrenal hormone, $\Delta^{4,5}$-3,11-20-triketo-17($\beta$),21-dihydroxypregnene.

This invention is concerned with compounds of the type represented by the intermediates 23 and 24 above and also with processes of producing same: These intermediates are represented by the formula:

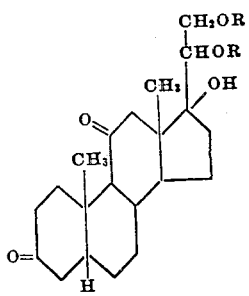

in which R is acyl or hydrogen.

The starting material employed in the process according to this invention, $\Delta^{17,20}$-3,11-diketo-21-acyloxypregnene, may be obtained as described in copending application Serial No. 649,765 filed February 23, 1946.

In accordance with this invention $\Delta^{17,20}$-3,11-diketo-2-acyloxypregnene is treated with osmium tetroxide in an inert solvent and the osmate so formed is hydrolyzed to give 3,11-diketo-17,20,21-trihydroxypregnane having the structural formula:

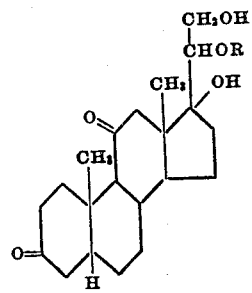

Mild acylation of the latter, preferably using an acid anhydride, gives the desired 3,11-diketo-17 ($\beta$) hydroxy-20,21-diacyloxypregnane, having the structural formula:

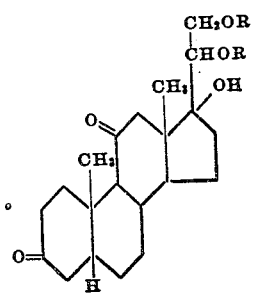

R being acyl. Instead of an acid anhydride, a carboxylic acid alone or in conjunction with its corresponding anhydride may be used to effect the acylation. Acylating agents capable of introducing the acyl group of propionic, butyric, valeric, caproic or capric acid, preferably from a lower aliphatic acid, i. e. one having 6 carbon atoms or less, may be used satisfactorily.

In the following example, the conversion of the $\Delta^{17,20}$-3,11-diketo-21-acyloxypregnene to 3,11-diketo-17 ($\beta$)-hydroxy-20,21 - diacyloxypregnane is described, but it will be understood this example is for purpose of illustration and that the invention is not limited thereto.

*Example*

A solution of 900 mg. of $\Delta^{17,20}$-3,11-diketo-21-acyloxypregnane in 14 cc. of absolute ether was treated with 770 mg. of osmium tetroxide and 450 mg. of anhydrous pyridine. The mixture was permitted to stand at room temperature overnight, the ether was then removed in vacuo, and the residue dissolved in 35 cc. of alcohol and treated with a solution of 5.5 grams of sodium sulfite in 24 cc. of water. The mixture was refluxed 3½ hours, filtered, and the filtrate concentrated in vacuo to a small volume and extracted with chloroform. The chloroform solution was washed with water and concentrated to dryness in vacuo, giving 3,11 - diketo - 17 ($\beta$),20,21-trihydroxypregnane, which was obtained in about 90% yield as the crystalline hydrate (melting point, approximately 100° C.).

The 20,21-diacetate was prepared by dissolving the above-described diketo trihydroxy compound in a mixture of 5 cc. of pyridine and 5 cc. of acetic anhydride, permitting the solution to stand at room temperature for 40 hours, and crystallizing the product from ether and from a small volume of ethyl acetate. The 3,11-diketo-17 ($\beta$)-hydroxy-20,21-diacetoxypregnane diacetate so obtained in about 100% yield had a melting point of 213°–214° C. $[\alpha]_D +93°$.

The temperatures mentioned in the example are room temperatures unless otherwise indicated. The temperatures, however, are not critical and the reactions may be carried out at higher or lower temperatures; but extremely high temperatures should be avoided because of the likelihood of decomposition of the desired products which may result from operation at such temperatures.

Unless otherwise stated, the reagents can be used in different proportions than are indicated in the above example as the proportions unless otherwise indicated are not critical, although enough of the reagents should be employed to insure substantially complete reaction to produce the desired products.

The specific rotation for 3,11-diketo-20,21-diacetylpregnane-17 ($\beta$)-hydroxypregnane, indicated above by the symbol $[\alpha]_D$, was determined in acetone solution using the D line of sodium.

Various changes and modifications might be made in my invention as defined herein without departing from the scope thereof. It is my intention that these changes and modifications, to the extent that they are comprehended within the scope of the appended claims, shall be considered as part of my invention.

What is claimed is:

1. 3,11-diketo-17 ($\beta$)-20,21-trihydroxypregnane.

2. 3,11-diketo-17 ($\beta$)-hydroxy-20,21-diacetoxypregnane.

3. The process that comprises reacting a compound of the cyclopentanoperhydrophenanthrene series having the basic structural formula:

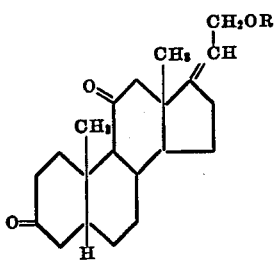

wherein R is a member of the class consisting of lower aliphatic acyl and hydrogen, with osmium tetroxide in the presence of a tertiary amine, hydrolyzing the reaction product to obtain a compound having the basic structural formula:

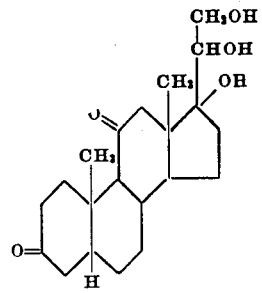

and treating this compound with a lower aliphatic acylating agent to produce the corresponding 20,21-diacyloxy compound.

4. The process that comprises reacting a compound of the cyclopentanoperhydrophenanthrene series having the basic structural formula:

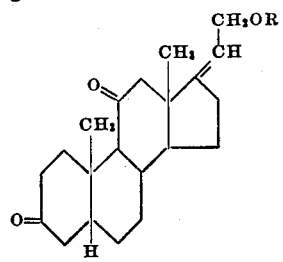

wherein R is a member of the class consisting of lower aliphatic acyl and hydrogen, with osmium tetroxide in the presence of a tertiary amine, hydrolyzing the reaction product to obtain a compound having the basic structural formula:

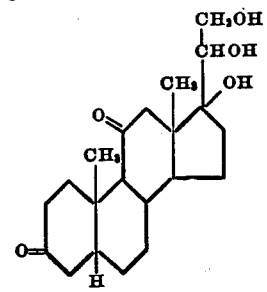

and treating this compound with acetic anhydride to produce the corresponding 20,21-diacyloxy compound.

LEWIS H. SARETT.

REFERENCES CITED

The following references are of record in the file of this patent:

UNITED STATES PATENTS

| Number | Name | Date |
| --- | --- | --- |
| 2,265,143 | Butenandt | Dec. 9, 1941 |